Feb. 4, 1958 P. H. BONNESS 2,821,751
METHOD OF FORMING INDENTATION IN INSULATING SHEETS
Filed Aug. 24, 1954
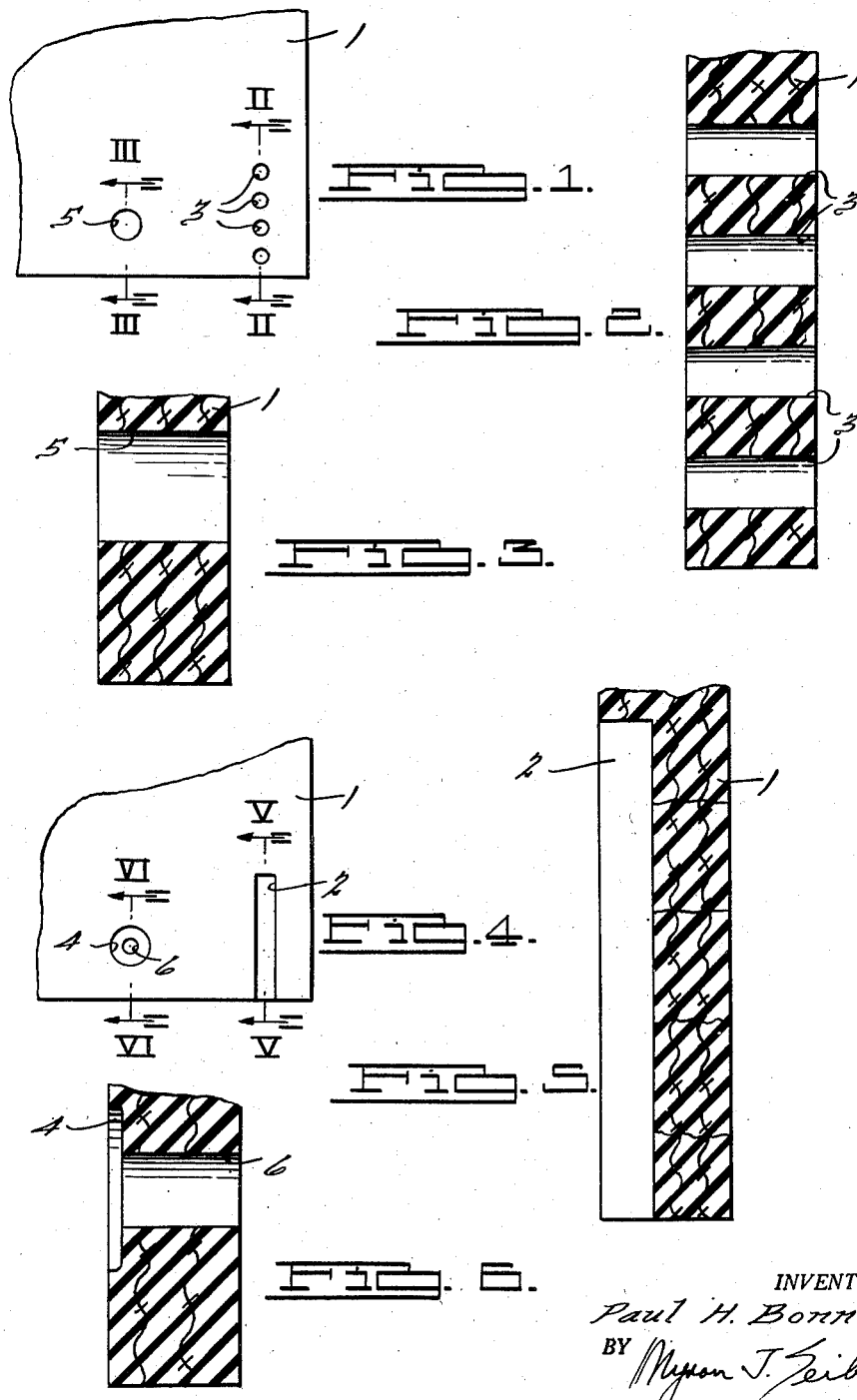
INVENTOR.
Paul H. Bonness
BY
ATTORNEY

United States Patent Office 2,821,751
Patented Feb. 4, 1958

2,821,751

METHOD OF FORMING INDENTATION IN INSULATING SHEETS

Paul H. Bonness, Wauwatosa, Wis., assignor to Square D Company, Detroit, Mich., a corporation of Michigan Application August 24, 1954, Serial No. 451,933

2 Claims. (Cl. 18—47.5)

This invention relates to a simple and economical method for forming indentations or partial openings such as slots and counterbores in insulating sheets and plates and has for its object the provision of such a method.

In the forming of slots and counterbores in insulating plates or sheets, milling or drilling operations are slow and expensive and the openings are not readily formed by the simple and inexpensive punching or pressing operation because the opening does not extend entirely through the material, or varies in size in extending therethrough, and also because of the difficulty of displacing the material of the insulating plate.

According to this invention, the insulating sheet or plate is made up of post-formable resin impregnated fabric, usually in layers, and which, prior to fabrication, is in partially cured form, and heating, punching and forming the plate to secure the desired final configuration. Certain steps in the method are illustrated in the drawing in which:

Figure 1 is a plan view showing a preliminary step in the method.

Figure 2 is an enlarged sectional view on the line II—II of Figure 1.

Figure 3 is an enlarged sectional view on the line III—III of Figure 1.

Figure 4 is a view similar to Figure 1 showing the final configuration of the fabricated part.

Figure 5 is an enlarged sectional view of the line V—V of Figure 4.

Figure 6 is an enlarged sectional view of the line VI—VI of Figure 4.

The sheet of post-formable material indicated at 1 is formed of layers of canvas or linen fabric impregnated with a phenolic resin such as Bakelite. With certain material formulae the piece may be substantially cured and still subject to becoming plastic while heated. However, with the ordinary formula resin the part is only partially cured and the final curing is substantially effected in the fabricating process.

The heating of the post-formable resin and plastic base sheet may be effected in any well-known way to a temperature which will depend upon the specific material formula used. In one commercial form in the operation of the method of this invention this temperature is 275° F. at which temperature the partially cured blank becomes plastic and may be worked. The punch and die used in forming the blank are also heated; in the specific example given, to a temperature of 200° F.

The first step in the forming of a slot indicated at 2 in Figures 4 and 5 is to punch through the sheet 1 a multiplicity of holes indicated at 3 in Figures 1 and 2, thus punching four slugs of the phenolic material from the piece to remove the material. Subsequently, the slot 2 is formed in a suitable die with the material between the holes 3 at the slot face of the piece displaced into the holes to substantially close the same at the opposite face as shown in Figure 5. Similarly, informing the counterbore 4 of Figures 4 and 6 an oversize hole 5 is punched through the phenolic blank as shown in Figures 1 and 3 and the counterbore 4 is formed by pressing and displacing some material into the oversized hole resulting in reducing it to the desired size indicated at 6 in Figure 6.

The pressure used in the final fabrication is such as to form the desired shape and to displace the material into the space provided therefor. One specific example in the piece under specific description herein, a slot .062″ x .062″ x .468 is formed in a phenolic plate .125″ thick and the counterbore is 7/32″ with a No. 38 hole. In this instance the forming pressure is 5¾ ton, but again the pressure is not critical and depends on the size and complexity of the part and the indentation to be made therein.

Conventionally, the formation of slots 2 and counterbores 4 would involve milling or drilling operations which are relatively slow and expensive. According to this invention, the slot and counterbore may be formed by simple punching and pressing operations which are rapid and low cost. By removing material from the post-formable resin and fabric plastic, the subsequent forming operation displaces some material into the place provided by the preliminary removal and permits the formation to be effected by a simple pressing operation. The temperature to which the material is heated results in substantially final curing in the forming operation. Preferably the pressure is maintained until final curing is effected but this is not essential.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a method of forming a single indentation having a predetermined configuration in a top surface of a flat piece of post-formable resin-impregnated material, the steps comprising: heating the piece to a temperature sufficient to render the piece plastic, forming a plurality of circular openings in the piece extending from the top surface thereof through a second surface, forcing the material of the top surface adjacent the openings into the openings toward the second surface thereby enlarging the openings at the top surface and closing the openings in the second surface and simultaneously forming a single indentation out of the plurality of openings.

2. In a method of forming an indentation having a predetermined configuration in a top surface of a flat piece of post-formable resin-impregnated material, the steps comprising; heating the piece to a temperature sufficient to render the piece plastic, forming at least one opening in the piece extending from the top surface through a second surface, forcing the material of the top surface adjacent the opening into the opening toward the second surface thereby enlarging the opening at the top surface and closing the opening at the second surface.

References Cited in the file of this patent

UNITED STATES PATENTS

| | | |
|---|---|---|
| 1,358,297 | Cushing | Nov. 9, 1920 |
| 2,427,072 | Rubin | Sept. 9, 1947 |
| 2,648,370 | Beach | Apr. 11, 1953 |